July 1, 1958 A. KÖBERLE 2,841,194
TOOL DRIVING AND GUIDING STRUCTURE FOR A MACHINE TOOL
Filed Nov. 7, 1955 2 Sheets-Sheet 1
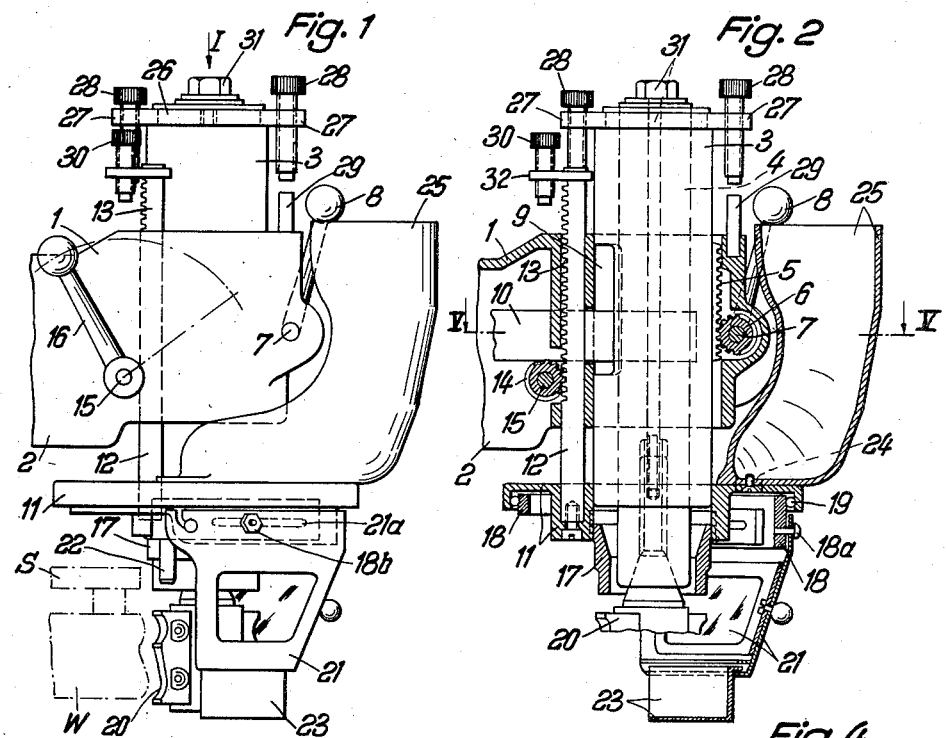
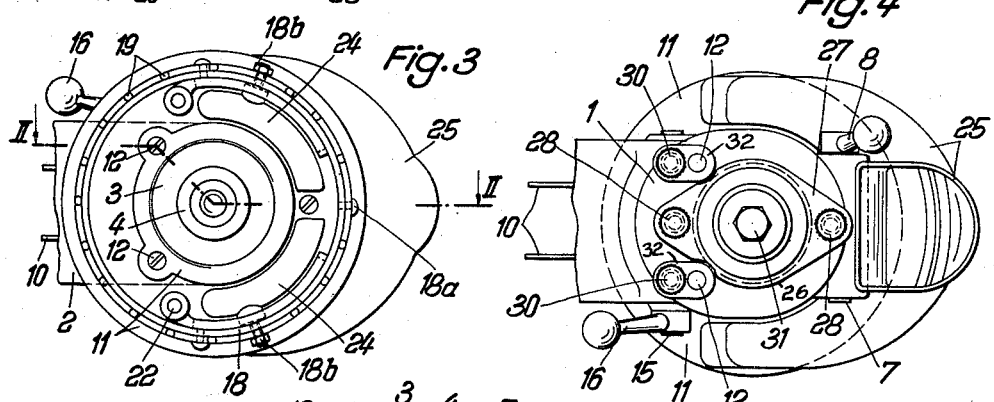
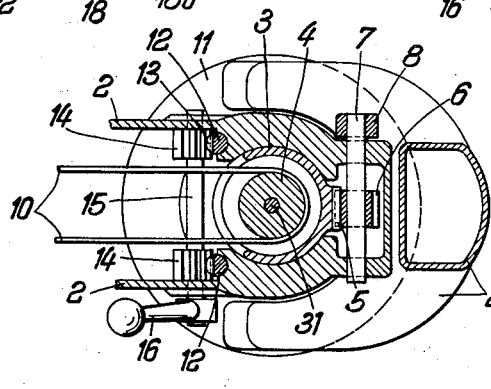
Inventor:
Albert Köberle
By: Michael S. Striker
agt.

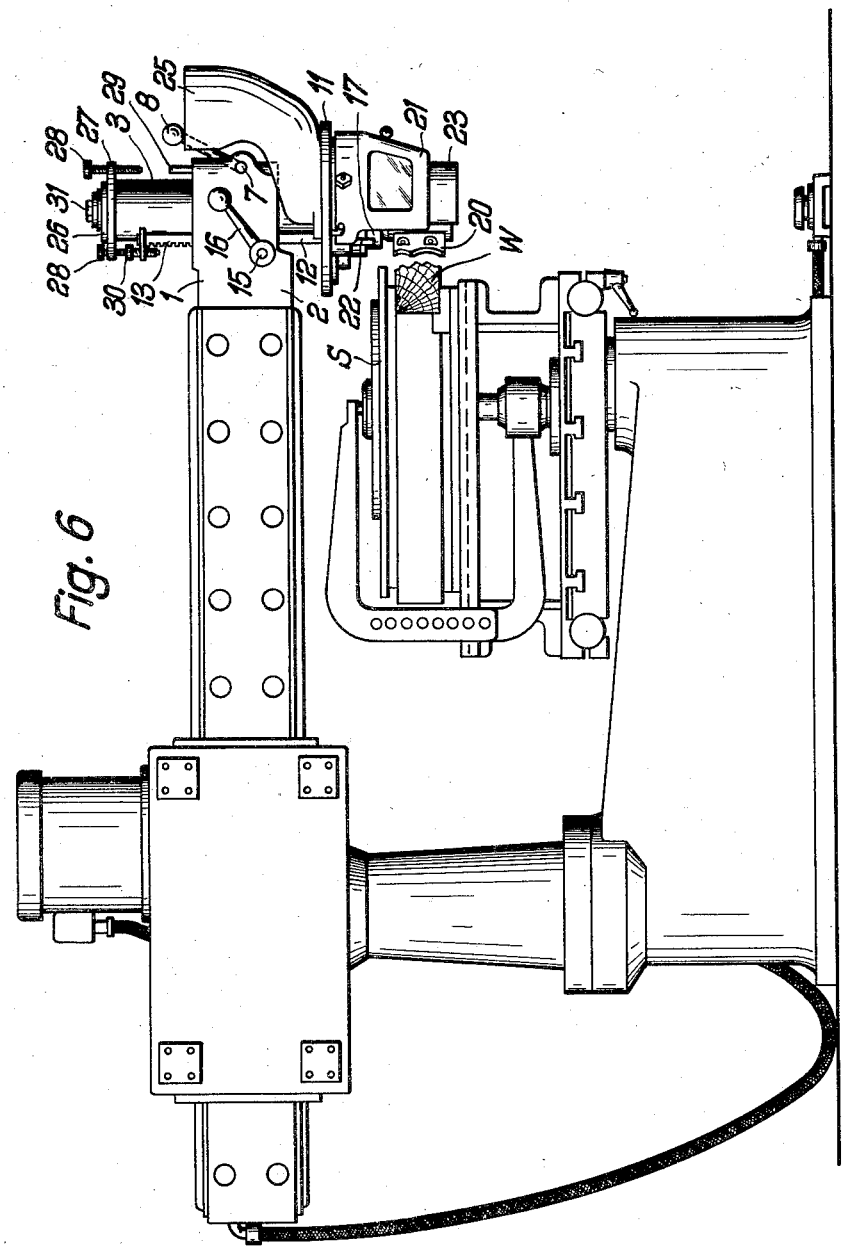

United States Patent Office 2,841,194
Patented July 1, 1958

2,841,194
TOOL DRIVING AND GUIDING STRUCTURE FOR A MACHINE TOOL

Albert Köberle, Oberriet, Switzerland, assignor to Firma B. Raimann G. m. b. H., Freiburg im Breisgau, Germany Application November 7, 1955, Serial No. 545,466

Claims priority, application Switzerland December 1, 1954

10 Claims. (Cl. 144—134)

The present invention relates to a machine tool.

More particularly the present invention relates to structure for guiding and driving a cutting tool of a machine tool.

One of the objects of the present invention is to provide a machine tool with a bearing which not only supports the cutting tool for rotation about its axis but also carries a guide for guiding the machine tool.

Another object of the present invention is to provide a machine tool with structure for limiting the extent to which the bearing and cutting tool can be shifted as well as for limiting the extent to which the guide for the cutting tool can be shifted.

A further object of the present invention is to provide a machine tool with a means for sucking away chips which are cut by the machine tool.

An additional object of the present invention is to provide a structure capable of accomplishing the above objects and at the same time composed of simple and ruggedly constructed elements which are very reliable in operation.

Also the objects of the present invention include a provision of an exceedingly simple drive for the spindle which carries the cutting tool.

With the above objects in view the present invention mainly consists of a machine tool which includes a support means which supports an elongated tubular bearing for shifting movement along its axis. This bearing is adapted to rotatably support a spindle which carries a cutting tool of the machine tool. Furthermore the tubular bearing guides a holding member for axial shifting movement along the bearing, and this holding member is adapted to carry a guide for guiding the machine tool along a predetermined path while the cutting tool is cutting a work piece.

The novel features which are considered as characteristic for the invention are set forth in particular in the appended claims. The invention itself, however, both as to its construction and its method of operation, together with additional objects and advantages thereof, will be bes understood from the following description of specific embodiments when read in connection with the accompanying drawings, in which:

Fig. 1 is a fragmentary side elevational view of that part of a machine tool which includes the structure of the invention;

Fig. 2 is a sectional elevational view taken along line II—II of Fig. 3 in the direction of the arrows;

Fig. 3 is a view of the structure of Fig. 1 as seen from the underside of Fig. 1;

Fig. 4 is a top plan view of the structure of Fig. 1;

Fig. 5 is a sectional plan view taken along line V—V of Fig. 2 in the direction of the arrows; and Fig. 6 is an elevational view of the machine tool in conjunction with the structure of the invention.

Referirng now to the drawings, the structure illustrated therein shows the invention as applied to a machine tool which works on wood, for example, in order to cut wooden mouldings or the like.

As may be seen from Figs. 1 and 2, the machine tool is provided with a radial arm 1 which in a known way may be supported for elevational and angular movement in order to adjust the posifion of the arm 1 with respect to a work piece. The work piece W is indicated in dot-dash lines in Fig. 1, and also a template S is also indicated in dot-dash lines in Fig. 1 just above the work piece W. As is shown most clearly in Fig. 2, the radial arm 1 which forms a support means for supporting the structure of the invention is formed at its outer free end portion with an opening passing therethrough, and a bearing 3 in the form of an elongated tubular sleeve is slidably supported for axial movement in the opening of the radial arm 1. Thus, the free end portion 2 of the radial arm 1 serves to support the bearing 3 for axial shifting movement. The bearing 3 supports an elongated tubular spindle for axial shifting movement, this spindle 4 extending along the interior of the bearing 3, and it will be noted that the spidnle 4 is longer than the bearing 3 and has a bottom free end portion extending downwardly beyond the bearing 3, as viewed in Fig. 2.

A moving means is provided to axially shift the bearing 3 with respect to its support means 1, 2. This movign means includes an elongated rack 5 fixed directly to the outer surface of the bearing 3 and extending in a direction parallel to the axis thereof, and a pinion 6 which meshes with the rack 5, the pinion 6 and rack 5 being accommodated in a suitable free space in the interior of the support means 1, 2. The pinion 6 is fixed to a shaft 7 which is rotatably carried by the support means 1, 2 so that in this way the pinion 6 is supported for rotation about its axis. An end portion of the shaft 7 extends outwardly beyond the support means 1, 2 and to this end portion a handle 8 is fixedly connected so that the operator may turn the handle 8 in order to turn the pinion 6 and in this way shift the rack 5 together with the bearing 3 in order to axially position the latter with respect to the support means 1, 2.

A drive in the form of a belt 10 is provided to drive the spindle 4 by rotating the latter about its axis. As is shown most clearly in Figs. 2 and 5, the tubular bearing 3 is provided in a wall portion thereof with a cutout 9 passing therethrough, and furthermore this bearing 3 is provided in its interior with a free space which surrounds a portion of the spindle 4 and communicates with the cutout 9, so that in this way the drive belt 10 may extend through the cutout 9 and along the free space in engagement with the spindle 4 in order to rotate the latter about its axis. The belt 10 also extends through suitable cutouts in the support means 1, 2 and is connected in an unillustrated way to a pulley or the like which is driven by any suitable motor so that in this way the spindle 4 may be driven.

In accordance with the present invention a holding member 11 for holding a guide means 17 for guiding the tool 20 is axially guided for shifting movement by the tubular bearing 3 itself. Thus, as is shown most clearly in Fig. 2, the holding member 11 takes the form of an annular ring into which the bottom free end portion of the bearing 3, as viewed in Fig. 2, slidably extends so that in this way the holding ring 11 is guided for axial shifting movement along the outer surface of the tubular bearing 3. The holding ring 11 is fixed by screws or the like, one of which is indicated in Fig. 2, to a pair of rods 12 which extend upwardly from the holding ring 12 through suitable bores in the support means 1, 2 which extend in a direction parallel to the bearing 3, so that the rods 12 are in this way guided by the support means for axial shifting movement in a direction parallel to the bearing 3. At least one of the rods 12 is provided with teeth 13 to form this rod 12 into a rack. However, in the illustrated example, as is evident from Fig. 5, both of the rods 12 are provided with the teeth 13 and therefore both of these rods 12 act as racks. A shaft 15 is supported for turning movement about its axis by the support means 1, 2, as is shown most clearly in Fig. 5, and this shaft 15 is fixed to a pair of pinions 14 which respectively mesh with the teeth 13 of the rods 12 so that when the shaft 15 is turned about its axis the pinions 14 will rotate to axially shift the rods 12 and in this way adjust the elevation of the holding ring 11 with respect to the tubular bearing 3. As is shown in Figs. 1, 3 and Fig. 5, as well as Fig. 4, a handle 16 is fixed to a portion of the shaft 15 which extends outwardly beyond the support means 1, 2, so that the operator may manually turn the shaft 15 to adjust the elevation of the holding ring 11. Any suitable means may be provided to retain the holding ring 11 as well as the bearing 3 at an adjusted elevation with respect to the support means 1, 2. Thus, if desired, the free end portion of shaft 15 which is distant from the handle 16 may be threaded and may carry a nut to tighten the shaft 15 with respect to the support means 1, 2 against rotation after the elevation of the holding ring 11 is adjusted, and in the same way the free end portion of shaft 7 which is distant from the handle 8 may be threaded and may carry a nut which may be tightened against the support means to prevent turning of the shaft 7 and in this way maintain the bearing 3 at an adjusted elevation.

The guide means 17 which is shown most clearly in Fig. 2 is in the form of an annular ring which is threadedly connected to the holding ring 11 at an inner surface portion thereof, as indicated in Fig. 2. This guiding ring 17 is provided with a pair of outer annular surface portions of different diameters, and either one of these annular surface portions may engage and slide along the template S so as to guide the cutting tool 20 while the latter is cutting the work piece W. One of the annular surface portions of the guide ring 17 may serve for rough cutting and the other of these annular surface portions may serve for the finish cutting operation. The guide ring 17 is shown as threadedly connected to the holding ring 11 in Fig. 2.

As is shown in Fig. 2, the holding ring 11 is of a substantially U-shaped cross section and is provided with an outer downwardly extending flange the inner surface portion of which is formed with an annular groove which serves as a ball race for the ball members 19 of a ball bearing whose inner race is formed by the ring 18 shown in Fig. 2. This ring 18 serves to carry a hood which defines a suction chamber from which chips cut by the tool 20 are sucked away in a manner described below. It will be noted particularly from Fig. 2 that the ring 18 is wider at its right end portion than at its left end portion, as viewed in Fig. 2.

In the example illustrated in the drawings the cutting tool 20 is connected in a manner described below to the spindle 4 for rotation therewith, and this cutting tool 20 is in the form of a hub carrying a plurality of cutting blades extending therefrom and having a configuration most clearly shown in Fig. 1, so that as these cutting blades rotate about the axis of the spindle 4, they will cut the work piece W to give the latter a configuration corresponding to the shape of the cutting edges of these cutting blades.

The turnable ring 18 carries the hood 21 which is composed of an outer sheet metal member which extends through approximately 180° about the cutting tool 20, as indicated in Figs. 1 and 2. Furthermore this hood 21 includes an inner transparent sheet which covers openings formed in the outer sheet metal portion of the hood so that the cutting tool may be seen by the operator through the openings in the hood 21. The transparent sheet is fixed to the inner surface of the sheet metal portion of the hood 21 by any suitable screw means or the like, indicated in Fig. 2. As is apparent from Figs. 1 and 2, the hood 21 is formed in its upper surface portion with elongated cutouts which enable the hood to be slipped on to pins extending from and fixed to the outer surface of the ring 18. Thus, the hood 21 is shown in Fig. 1 as provided at its upper left end portion with a curved notch enabling the hood 21 to be passed onto a pin fixed to the ring 18. Furthermore, as is shown at the upper right portion of the hood 21 in Fig. 2, pins 18a may be passed through openings of the hood 21 into openings of the ring 18 to removably fix the hood 21 in this way to the ring 18.

Stop members 22 are provided to limit the turning movement of the ring 18 and hood by engagement with the template S. One of these stop members 22 is shown in Fig. 1, and both of the stop members 22 are shown as they appear from the underside of Fig. 1 in Fig. 3. The stop members 22 are each carried by an arcuate member each of which is formed with a slot 21a, indicated in Fig. 1. One of these arcuate members is partly shown in Fig. 2 extending just to the right of the inner downwardly extending flange of the holding ring 11. The arcuate members which carry the stops 22 are located against the inner side surface of the ring 18, and a screw 18b passes through the slot of each arcuate member and through an opening in the hood 21, a nut being in threaded engagement with each of these screws 18b and engaging the outer surface of the hood 21 so that in this way the screws 18b serve to fix the stops 22 in an adjusted angular position with respect to the ring 18 and also to fix the hood 21 on the ring 18. It is believed to be apparent that as the cutting tool 20 cuts the work piece W the stops 22 may turn slightly in one direction or the other into alternate engagement with the template S in order to cause the hood 21 to remain in a position where its interior is directed towards the work so that in this way a suction force in the interior of the hood 21 will draw away almost all of the chips cut by the cutting tool 20. The bottom peripheral portion of the hood 21 is provided with a pair of inwardly extending flanges which define between themselves an arcuate groove, and an auxiliary hood member 23 having the configuration indicated in Figs. 1 and 2 is provided at its upper edge with an outwardly extending annular flange which extends into this groove so that in this way the auxiliary hood 23 is carried by the hood 21, the bottom surface of the hood 23 extending beneath the cutting tool 20.

As was pointed out above, a suction means is provided to produce a suction force in the space within the hood 21 in order to draw away chips cut by the cutting tool 20. This suction means includes a hollow member 25 fixed to the top surface of the holding ring 18, in the manner indicated in Fig. 2. The configuration of the hollow member 25 is evident not only from Figs. 1 and 2, but also from Figs. 3–5. The hollow member 25 has a top open end, shown in Fig. 4, and to this top open end may be connected a flexible hose or the like which is in turn connected to any suitable source of suction. The bottom wall of the member 25 is provided with a pair of arcuate openings which are in alignment with a pair of arcuate openings 24 formed in the ring 11, these openings 24 being shown most clearly in Fig. 3. The openings 24 of the ring 11 are identical with the openings 24 of the hollow member 25, so that through these openings the force of suction acts on the space within the hood 21.

A stop means is provided to limit the downward movement of the bearing 3, and this stop means takes the form of a ring 26 which is threadedly connected to a top end portion of the bearing 3 so that this ring 26 in addition to being carried by the bearing 3 is turnable with respect to the same. The configuration of the ring 26 is most clearly shown in Fig. 4, and as is apparent from Figs. 1, 2, and 4, the ring 26 has a pair of outwardly extending lugs 27 fixed thereto and provided with threaded bores, respectively, through which a pair of screws 28 threadedly pass, respectively. The screws 28 have knurled heads, so that the operator may turn these screws 28, and the support means 1, 2 fixedly carries a pair of stop pins 29 which are respectively in axial alignment with the screws 28, these latter screws as well as the stop pins 29 extending in a direction parallel to the axis of the bearing 3. Thus, as the bearing 3 is shifted downwardly, the stop screws 28 approach the stop pins 29, and when the pins 28 respectively engage the pins 29 the bearing 3 cannot be moved down any further. Of course, it is possible to adjust the screws 28 to adjust the extent to which the bearing 3 can be lowered. Only one stop pin 29 is shown in the drawings for the sake of clarity.

In a similar manner a stop means is provided to limit the downward movement of the holding ring 11. This latter stop means takes the form of a pair of plates respectively fixed to the top end of the rods 12 and extending laterally therefrom to the left, as viewed in Figs. 1, 2, and 4, each of these plates being provided with a threaded bore through which a screw 30 threadedly passes. The screws 30 also have knurled head ends, and their bottom ends are directed toward an outer surface portion of the support means 1, 2. Thus, by adjusting the axial position of the screws 30 with respect to the plates which carry the same and which are fixed to the top free end portions of the rods 12, respectively, it is possible to adjust the downward movement of the rods 12 and therefore of the holding ring 11. When the screws 30 engage an upper surface portion of the supporting means 1, as viewed in Figs. 1 and 2, the rods 12 and holding ring 11 cannot be moved down further.

The spindle 4 is fixed at its top end to a plate which overlaps the ring 26 so that the spindle 4 cannot move downwardly beyond the position shown in Fig. 2 with respect to the bearing 3. This plate which overlaps the ring 26 may be welded to the top end face of the spindle 4, for example. This latter plate as well as the spindle 4 are formed with an axial bore passing completely through the spindle and plate, and a screw 31 has its head end in engagement with washers which in turn engage the plate fixed to the top end of the spindle 4. The screw 31 extends downwardly through the spindle 4 into threaded engagement with a threaded bore in the top end portion of that part of the tool 20 which extends into the spindle 4. Thus, by tightening the screw 31 it is possible to tightly fix the tool 20 to the spindle 4 for rotation therewith. It should be noted that the screw 31 may also be threadedly connected to a collet which may receive a tool and which may have its tongues moved into gripping and releasing engagement by the turning of the screw 31.

Also, any suitable means may be provided for automatically moving the structure of the invention along the template S.

Also, by providing suitable tools to be carried and driven by the spindle 4, it is possible to use the structure of the invention for work on light metals and plastics as well as wood.

It will be understood that each of the elements described above, or two or more together, may also find a useful application in other types of machine tools differing from the types described above.

While the invention has been illustrated and described as embodied in structure for guiding and driving a cutting tool of a machine tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, a bearing for a spindle which drives the tool of the machine tool; support means supporting said bearing for axial movement; moving means operatively connected to said bearing for axially shifting the same; a holder guided by said bearing for axial movement along the length thereof, said holder being adapted to hold a guide for the tool; and second moving means operatively connected to said holder for axially shifting the same along the axis of said bearing, whereby said bearing and said holder may be moved relative to and independent from each other.

2. In a machine tool, in combination, a bearing for a spindle which drives the tool of the machine tool; support means supporting said bearing for axial movement; a holder guided by said bearing for axial movement along the length thereof, said holder being adapted to hold a guide for the tool; a rack fixed to said bearing and extending axially along the same; a pinion meshing with said rack and carried for rotation about its axis by said support means; means connected to said pinion for turning the same in order to axially shift said bearing; and moving means operatively connected to said holder for axially shifting the same along the axis of said bearing, whereby said bearing and said holder may be moved relative to and independent from each other.

3. In a machine tool, in combination, a bearing for a spindle which drives the tool of the machine tool; support means supporting said bearing for axial movement; a holder guided by said bearing for axial movement along the length thereof, said holder being adapted to hold a guide for the tool; a rack fixed to said bearing and extending axially along the same; a pinion meshing with said rack and carried for rotation about its axis by said support means; means connected to said pinion for turning the same in order to axially shift said bearing; a ring carried by said bearing at an end portion thereof distant from the end thereof adjacent which the tool is adapted to be located; a first stop member adjustably carried by said ring and extending in a direction substantially parallel to the axis of said bearing; and a second stop member carried by said support means and positioned along the axis of said first stop member so that when said bearing is axially shifted said first stop member will engage said second stop member to limit the axial movement of said bearing.

4. In a machine tool, in combination, a bearing for a spindle which drives the tool of the machine tool; support means supporting said bearing for axial movement; a holder guided by said bearing for axial movement along the length thereof, said holder being adapted to hold a guide for the tool; a pair of elongated rods fixed to said holder and extending therefrom in a direction parallel to the axis of said bearing, said rods being guided for sliding movement along their axes, respectively, by said support means, and at least one of said rods being formed with teeth so that said one rod acts as a rack; a pinion carried for rotation about its axis by said support means and meshing with said one rack; and manual turning means connected to said pinion for turning the same in order to axially shift said rods and thereby move said holder axially along said bearing.

5. In a machine tool, in combination, a bearing for a spindle which drives the tool of the machine tool; support means supporting said bearing for axial movement; a holder guided by said bearing for axial movement along the length thereof, said holder being adapted to hold a guide for the tool; a pair of elongated rods fixed to said holder and extending therefrom in a direction parallel to the axis of said bearing, said rods being guided for sliding movement along their axes, respectively, by said support means, and at least one of said rods being formed with teeth so that said one rod acts as a rack; a pinion carried for rotation about its axis by said support means and meshing with said one rod; manual turning means connected to said pinion for turning the same in order to axially shift said rods and thereby move said holder axially along said bearing; and adjustable stop means carried by said one rod and having a free end directed to an outer surface portion of said support means in order to engage said outer surface of said support means when said rods are axially shifted so as to limit the axial movement of said rods and thereby limit movement of said holder.

6. In a machine tool, in combination, a bearing for a spindle which drives the tool of the machine tool; support means supporting said bearing for axial movement; a holder guided by said bearing for axial movement along the length thereof, said holder being adapted to hold a guide for the tool; and a guide ring carried by said holder for guiding the tool along a template, said guide ring having outer surface portions of different diameters, respectively adapted to engage the template during rough cutting and finish cutting operations so that the same template may be used for both operations.

7. In a machine tool, in combination, a bearing for a spindle which drives the tool of the machine tool; support means supporting said bearing for axial movement; a holder guided by said bearing for axial movement along the length thereof, said holder being adapted to hold a guide for the tool; and a guide ring supported for rotation about its axis by said holder and adapted to engage a member for guiding the tool during operation of the machine tool.

8. In a machine tool, in combination, a bearing for a spindle which drives the tool of the machine tool; support means supporting said bearing for axial movement; a holder guided by said bearing for axial movement along the length thereof, said holder being adapted to hold a guide for the tool; a hood carried by said holder and adapted to partly surround the tool in order to serve as a suction chamber for drawing off chips cut by the tool; and means connecting said hood to said holder for free turning movement about an axis substantially parallel to the axis of said bearing.

9. In a machine tool, in combination, support means; an elongated tubular bearing carried by said support means for axial movement; moving means operatively connected to said bearing for axially shifting the same; an annular holding ring into which said bearing slidably extends so that said ring is guided by said bearing for slidable movement axially along the latter; annular guide means fixed to said ring for guiding a tool; and second moving means operatively connected to said holding ring for axially shifting the same along the axis of said bearing, whereby said bearing and said holding ring may be moved relative to and independent from each other.

10. In a machine tool, in combination, support means; an elongated tubular bearing carried by said support means for axial movement; moving means operatively connected to said bearing for axially shifting the same; an annular holding ring into which said bearing slidably extends so that said ring is guided by said bearing for slidable movement axially along the latter; second moving means operatively connected to said holding ring for axially shifting the same along the axis of said bearing, whereby said bearing and said holding ring may be moved relative to and independent from each other; annular guide means fixed to said ring for guiding a tool; and suction means communicating with a space in which said holding ring and guide means are located for sucking away chips cut by the tool also located in said space.

References Cited in the file of this patent

UNITED STATES PATENTS

| | | |
|---|---|---|
| 1,480,423 | Tate | Jan. 8, 1924 |
| 1,715,292 | Hoffman et al. | May 28, 1929 |
| 1,742,217 | Renwick | Jan. 7, 1930 |
| 1,745,780 | Casey | Feb. 4, 1930 |
| 1,989,285 | Merrigan | Jan. 29, 1935 |
| 2,045,422 | Tautz | June 23, 1936 |
| 2,353,202 | Tautz | July 11, 1944 |

FOREIGN PATENTS

| | | |
|---|---|---|
| 679,585 | Germany | Aug. 9, 1939 |